US006832236B1

(12) United States Patent
Hamilton, II et al.

(10) Patent No.: US 6,832,236 B1
(45) Date of Patent: Dec. 14, 2004

(54) METHOD AND SYSTEM FOR IMPLEMENTING AUTOMATIC FILESYSTEM GROWTH MONITOR FOR PRODUCTION UNIX COMPUTER SYSTEM

(75) Inventors: Rick A. Hamilton, II, Austin, TX (US); John Steven Langford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/350,033

(22) Filed: Jul. 8, 1999

(51) Int. Cl.[7] ............................................... G06F 11/00
(52) U.S. Cl. ........................... 709/100; 709/223; 714/4; 714/43; 714/47; 714/55
(58) Field of Search ............................... 709/100, 223, 709/224; 714/4, 43, 47, 55

(56) References Cited

U.S. PATENT DOCUMENTS

| 5,276,867 A | * | 1/1994 | Kenley et al. ............... 395/600 |
| 5,659,547 A | * | 8/1997 | Scarr et al. ............ 395/182.02 |
| 5,696,701 A | * | 12/1997 | Burgess et al. ............... 714/47 |
| 5,745,692 A | * | 4/1998 | Lohmann, II et al. .. 395/200.53 |
| 5,751,964 A | * | 5/1998 | Ordanic et al. ........ 395/200.54 |
| 5,872,931 A | * | 2/1999 | Chivaluri ............... 395/200.53 |
| 6,282,661 B1 | * | 8/2001 | Nicol .......................... 714/47 |
| 6,415,189 B1 | * | 7/2002 | Hajji .......................... 714/47 |
| 6,415,243 B1 | * | 7/2002 | Mann .......................... 714/47 |

OTHER PUBLICATIONS http://support.openwave.com/email_kx/docs/books/4.1x/4.1/html/operations/opspr.htm#P0_0.*
Voleynik, Jarra; Voleynik, Anna. "System Administrator." Linux Journal. Jan. 1999.*
https://support.openwave.com/email_kx/docs/books/4.1.x/4.1/html/operations/toc.htm.*

* cited by examiner

Primary Examiner—David Wiley
Assistant Examiner—Alina N Boutah
(74) Attorney, Agent, or Firm—Duke W. Yee; David A. Mims, Jr.; Patrick C. R. Holmes

(57) ABSTRACT

A script is created which accurately monitors filesystem usage. Initially, a filesystem is identified to be monitored. Growth parameters for the particular filesystem are stipulated which, if exceeded, will result in notification to an administrator of the system. Thresholds are set for the selected growth parameters. Script execution timing is set, and the script is automatically executed at the preset time intervals. Each time the script executes, a comparison is made between the system specifics and preset growth thresholds. If a filesystem exceeds a threshold, then notification is provided to the system administrator.

25 Claims, 8 Drawing Sheets

```
!/bin/ksh function usage {
  print "Usage: fsmon [-v] [-f filesystem] [-e email_addr] [-p percent_used]"
  print "             [-u unused_megabytes] [-c number_of_rising_periods]"
  print "  -v:                   Verbose."
  print "  -f filesystem:        The name of the filesystem that you"
  print "                        want to monitor (e.g./usr)."
  print "  -e email_address:     Where the notices are sent."
  print "  -p percent_used:      Trigger point! When the filesystem"
  print "                        gets to be\"percent_used\" full..."
  print "  -u unused_megabytes:  Trigger point! When the filesystem"
  print "                        has\"unused_megabytes\" or less free"
  print "  -c number_of_rising_periods: Trigger point! Everytime this script"
  print "                        runs it samples the filesystem size."
  print "                        If\"number_of_rising_periods\" (+1)"
  print "                        consecutive samples are strictly"
  print "                        increasing, then trigger."
  exit 1
} save the command line for later

cmdline=$*

#The first three variables have defaults

verbose="false"
filesystem="/var"
emailaddr="root@$(hostname)"

#This next variable will be assigned a default value
#if neither -p, -u nor -c are not specified

DEFAULT_PERCENT_USED="80%"
percentused=""

The last two variables do not have defaults unusedmegs=""
constrise=""
```

FIG. 7

```

#parse the command line arguments

while getopts ":vf:e:p:u:c:" opt;
do
  case ${opt} in
    v)verbose="true";;
    f)filesystem=${OPTARG};;
    e)emailaddr=${OPTARG};;
    p)percentused=${OPTARG};;
    u)unusedmegs=${OPTARG};;
    c)constrise=${OPTARG};;
    *)usage;;
    \?)usage;;
  esac
done
shift $(($OPTIND - 1))
if [[ $#!=0]];
then
  usage
fi collect information on the filesystem

set $(df ${filesystem} | grep ${filesystem})
FSPU=${4%?}
FSUU=${3}
FSUM=$((${3} / 2048))

#make a temporary file to store the potential mail message

maildata=/tmp/fsmon.$$
if[[ -z "${percentused}" && -z "${unusedmegs}" && -z "${constrise}" ]];
then
  percentused=${DEFAULT_PERCENT_USED}
fi if[[ -n ${percentused} ]];
then
  if (( ${FSPU} > ${percentused} ));
  then
    print "${filesystem} is ${FSPU}% full...">>${maildata}
  fi
fi if[[ -n ${unusedmegs} ]];
then
  if [[ ${FSUM} < ${unusedmegs} ]];
  then
    if [[ ${FSUM} = 1 ]];
    them
      print "${filesystem} has only 1 Mbyte free...">>${maildata}
```

FIG. 8

```
if [[ -n ${constrise} ]];
then
  FS=$(print ${filesystem} | sed "s;/;_;g")
  constrise_file=/tmp/fsmon_${FS#_}
  print ${FSUU} >> ${constrise_file}
  currlines=$(wc -l ${constrise_file})
  currlines=${currlines% *}
  currlines=${currlines## }
  if (( ${currlines} > ${constrise} ));
  then
    TMPFILE=/tmp/fsmon_temp_$$
    tail -n ${constrise} ${constrise_file} >${TMPFILE}
    mv ${TMPFILE} ${constrise_file}
    sort -n -u ${constrise_file} -o ${TMPFILE}
    diff ${constrise_file} ${TMPFILE} 2>&1 >/dev/null
    rc=$?
    if (( ${rc} == 0 ));
    then
      print "${filesystem} is continuing to grow..." >> ${maildata}
    fi
    rm -f ${TMPFILE}
  fi
fi

# If the mail is not empty, then send an email notification

if [[ -s ${maildata} ]];
then
  TMPFILE=/tmp/fsmon_temp_$$
  rm -f ${TMPFILE}
  if [[ ${verbose} = "true" ]];
  then
    print "This note was generated automatically by \"fsmon\"." >$TMPFILE
    print " date:    $(date)" >>$TMPFILE
    print " machine: $(hostname)" >>$TMPFILE
    print "fsmon ${cmdline}" >>$TMPFILE
    print>>$TMPFILE
  fi
  cat ${maildata} >>$TMPFILE
  mail -s "fsmon: found something interesting!" ${emailaddr} < ${TMPFILE}
fi rm -f ${maildata}
rm -f $TMPFILE
```

FIG. 9

METHOD AND SYSTEM FOR IMPLEMENTING AUTOMATIC FILESYSTEM GROWTH MONITOR FOR PRODUCTION UNIX COMPUTER SYSTEM

BACKGROUND OF THE INVENTION

1. Technical Field

The present invention relates to information systems technology. More particularly, the present invention relates to providing a tool for automating system monitoring functions of a computer system. Still more particularly, the present invention relates to a method and system for providing automated assessments of a computer system's file storage capacities.

2. Description of Related Art

The UNIX operating system, or "UNIX," "A weak pun on Multics," is an interactive time-sharing operating system invented in 1969 by Ken Thompson after he left Bell Labs and the Multics project, apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called. profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and—ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called inode numbers, are used only within the UNIX operating system kernel itself. While UNIX uses inode number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding inode numbers. Given the name of a file, UNIX looks in the file's directory and obtains the corresponding inode number for the file. With this inode number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves.

The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct inode is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an inode pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Catastrophic failure is defined as any hardware problem, including but not limited to disk, planar, or adapter anomalies, which cause information about data placement or user environment to be lost to the base operating system. It is also possible, though less likely, that such failure incidents can originate within software, due to defects in coding or method of execution.

Practically speaking, the beauty of UNIX is that it suffers fewer catastrophic failures than many other operating systems. Protection of the kernel, for instance, is far greater than is found in Win95/98/NT. However, the complexity of UNIX and the adaptability/configurability of it, means that reconfiguration following such a catastrophic failure can be a far more difficult task than configuring other operating systems. While UNIX based systems tend to fail less often than other operating system, it is harder to recover from those failures because of the complexity of the system. Moreover, UNIX system problems that precipitate failure may have been discoverable for some length of time before the actual failure occurs.

In today's Information Systems (IS) environment, many conflicting demands are placed on systems administrators. Often, a single individual is responsible for maintaining computers with varied operating systems, for resolving network issues, and for dealing with end-user complaints about applications. Normally one of the duties of a system administrator is to keep an eye on filesystem usage. The duty must be performed several times a day in a dynamic IS shop. Generally, repeated checks are made on the particular filesystems. This is not only a poor use of an administrator's time, but as often happens, a hurried system administrator may overlook the mundane tasks associated with system monitoring, especially in a time of crisis. Another problem is that each filesystem may not get checked at appropriate time intervals. A filesystem might have a usage history of being dormant, lulling the system administrator into a false sense that the usage history will remain constant and thereafter awakening that administrator with a file usage catastrophe.

Therefore, it would be advantageous to provide system administrators with an automated tool for monitoring system resources, such as filesystem usage. It would further be advantageous to relieve the burden of filesystem monitoring from the administrator. It would be even more advantageous to provide a configurable growth monitoring tool for system administrators.

SUMMARY OF THE INVENTION

The present invention relates to a method and system for implementing an automatic filesystem growth monitor for computer systems. In a preferred embodiment, a script is created that accurately monitors filesystem usage. Initially, a filesystem is identified to be monitored. Growth parameters for this particular filesystem are selected, which best reflect the filesystem's growth. Thresholds are set for the selected growth parameters. Script execution timing is set, and the script is automatically executed at the preset time intervals. Each time the script executes, a comparison is made between the system specifics and preset growth thresholds. If a filesystem exceeds a threshold, notification is provided to the system administrator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7, 8 and 9 are a script which, when executed, monitors system usage based on predetermined growth parameters in accordance with a preferred embodiment of the present invention.

DETAILED DESCRIPTION OF THE PREFERRED EMBODIMENT

Figure 1:
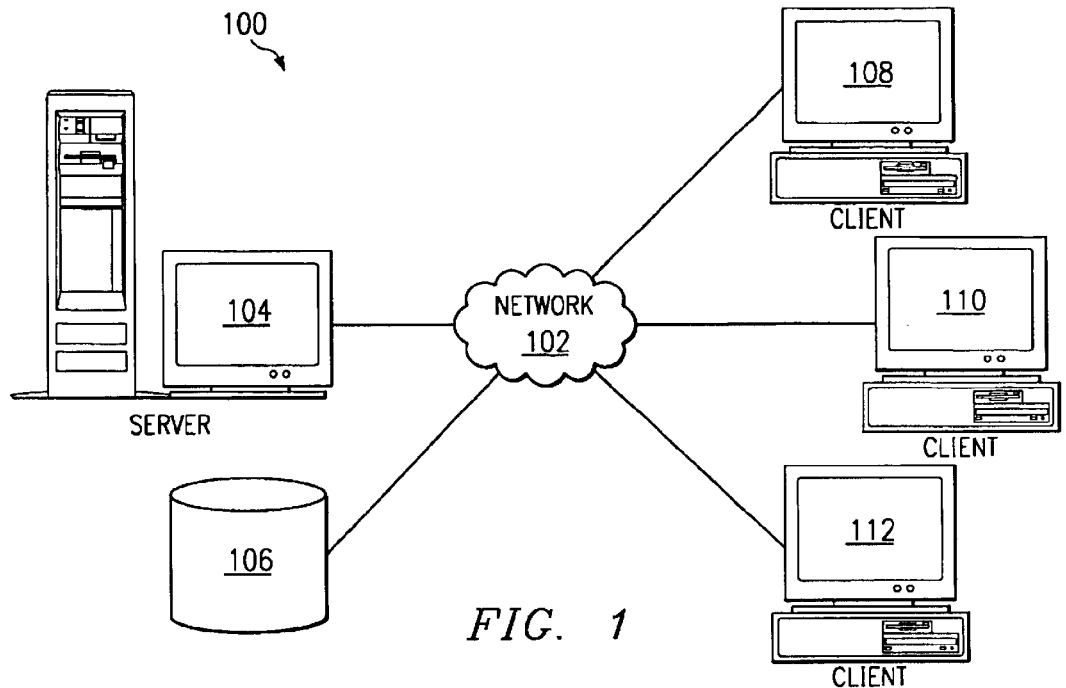
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
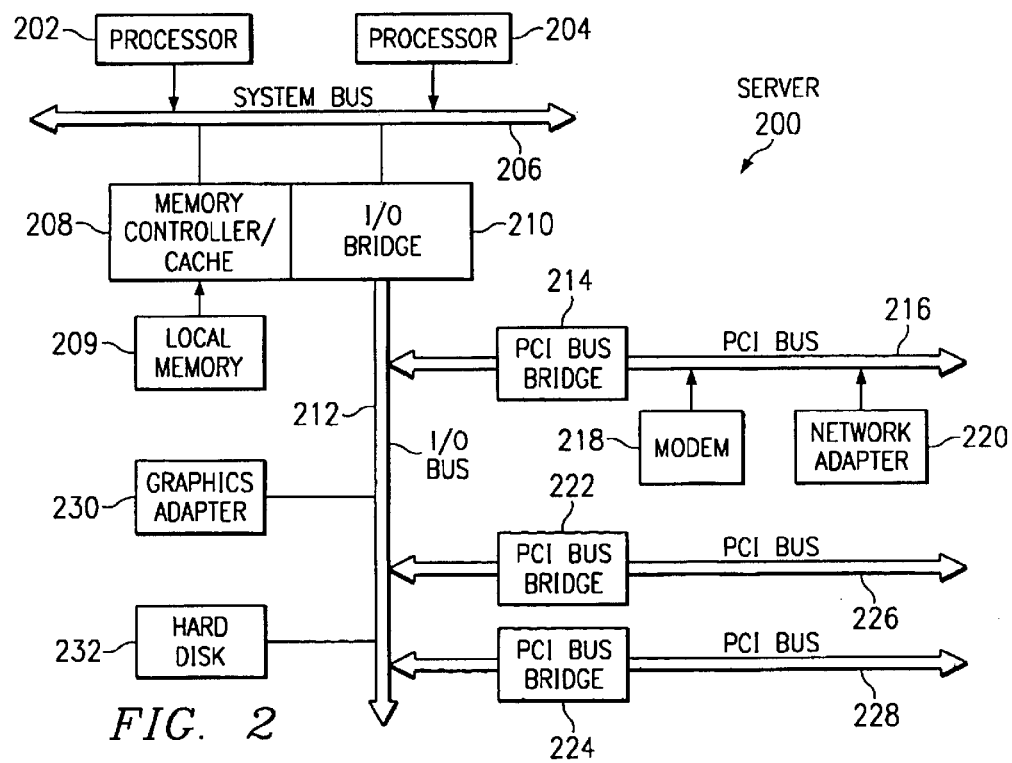
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
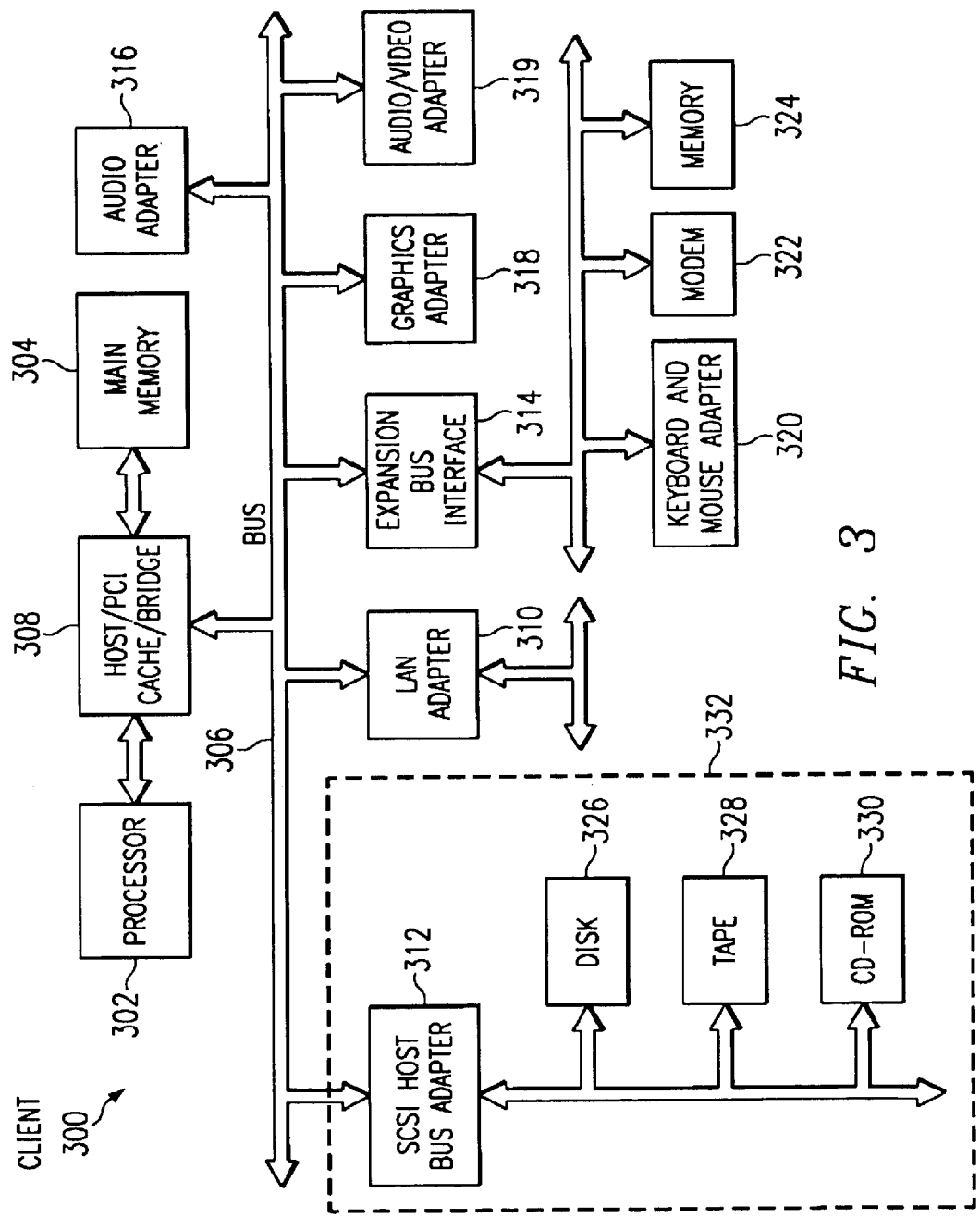
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Because examining filesystem growth for numerous machines can be time consuming, the present invention constitutes a user configurable tool that monitors filesystem growth, compares the growth to user specified thresholds, and alerts administrators if growth exceeds these preset thresholds. With this script in place, administrators no longer need to make filesystem checks a part of their daily ritual. Instead, administrators receive email and, if their paging services support email text, can even receive a page if filesystem growth exceeds previously defined limits. Consequently, administrators are free to pursue other responsibilities and worry less about their UNIX systems.

A preferred embodiment of the present invention is embodied in an executable script. The script is placed on the machine for which monitoring is to occur, in any convenient directory. An entry is made in the crontab, stipulating the time interval at which the tool is to be run. For most organizations, a daily examination of filesystem usage specifics is enough. For others, the polling interval might be as frequent as once an hour, or even more frequently if the environment is dynamic enough to warrant it. When making this entry into the crontab, certain variables are specified, including who should be notified in case of a problem, the filesystem to be monitored, and trigger criteria. At the next scheduled time, crontab executes the script. In turn, the script writes filesystem usage specifics to a file specified for future trend analysis; and it also compares current filesystem usage specifics or values to the specified threshold values for immediate action. Finally, if trend analysis for consecutive growth periods has been stipulated, these calculations are also made. If any trigger criteria are met, the script sends an email notification to the specified party (or parties) so that the specified administrator can intervene.

Figure 4:
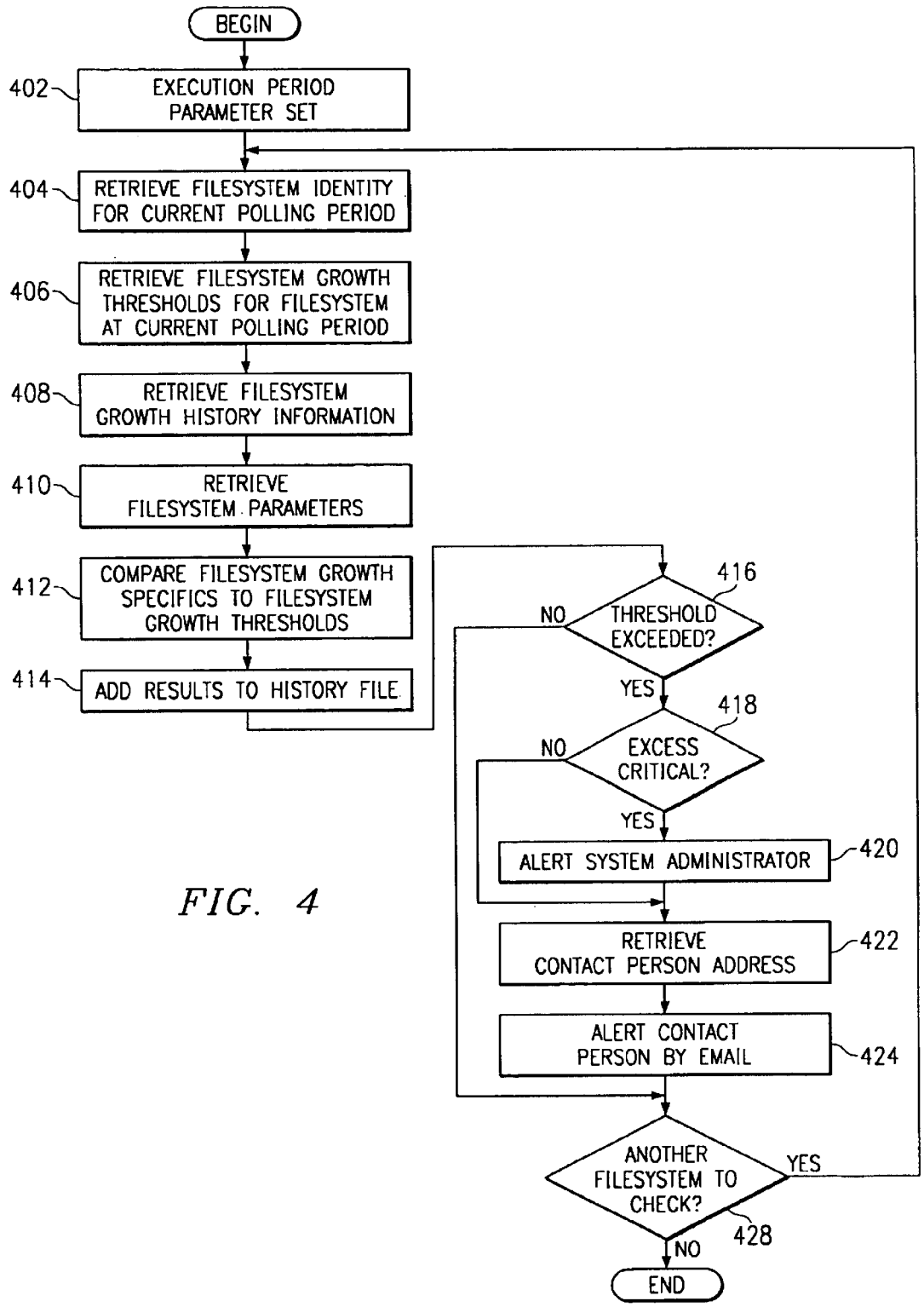
FIG. 4 is a flowchart depicting a process for automated monitoring of filesystem growth in accordance with a preferred embodiment of the present invention.

FIG. 4 is a flowchart depicting a process for automated monitoring of filesystem growth in accordance with a preferred embodiment of the present invention. Initially, an execution period parameter is set for execution of the growth monitor script (step 402). Next, the filesystem identity for the current polling period is retrieved (step 404). The present invention allows for performing multiple growth monitoring checks, on one or a plurality of filesystems. In another embodiment, growth monitoring of particular filesystems may be staggered, thereby monitoring critical filesystems more frequently than less critical filesystems. Next, the growth thresholds for the filesystem to be checked at the current polling period are retrieved (step 406). Growth thresholds, in accordance with a preferred embodiment of the present invention, may be a percentage of the useable physical space for the filesystem, the total volume of the filesystem, or a growth rate measured by a predefined number of consecutive rising use growth periods.

Returning to FIG. 4, the growth history information for the filesystem is retrieved (step 408). The script then retrieves the filesystem parameters that describe the filesystem's volume in terms of total volume and percentage of useable volume (step 410). These are dynamic terms and, therefore, the most up-to-date filesystem usage specifics must be retrieved from the computer system. After filesystem usage specifics have been retrieved, they are compared with the filesystem growth thresholds (step 412). After a comparison has been made, the results of the comparison are added to the history files (step 414). Next, a determination is made as to whether any of the thresholds have been exceeded (step 416). If none of the thresholds have been exceeded, the process flows to step 428, where a determination is made as to whether another filesystem is to be checked.

If, at step 416, a threshold has been exceeded, a determination is made as to whether the excess is critical for the particular filesystem (step 418). If the excess is critical, the system administrator is immediately alerted (step 420). Once the administrator is alerted, the address of the contact person is retrieved (step 422). Clearly, the contact person would most often be the system administrator; however, in the event of a critical excess, the administrator may be contacted by alternative means, or every administrator in the contact administrators group may be alerted in an effort to circumvent an almost imminent problem. Returning to step 418, if the excess is not critical, the process flows immediately to step 422, where the address of the contact person is retrieved. The contact person is then alerted by email (step 424). Next, a determination is made as to whether another filesystem is to be checked (step 428). If another filesystem is to be checked at the current polling period, the process reverts to step 404. Otherwise, the process ends.

Figure 5:
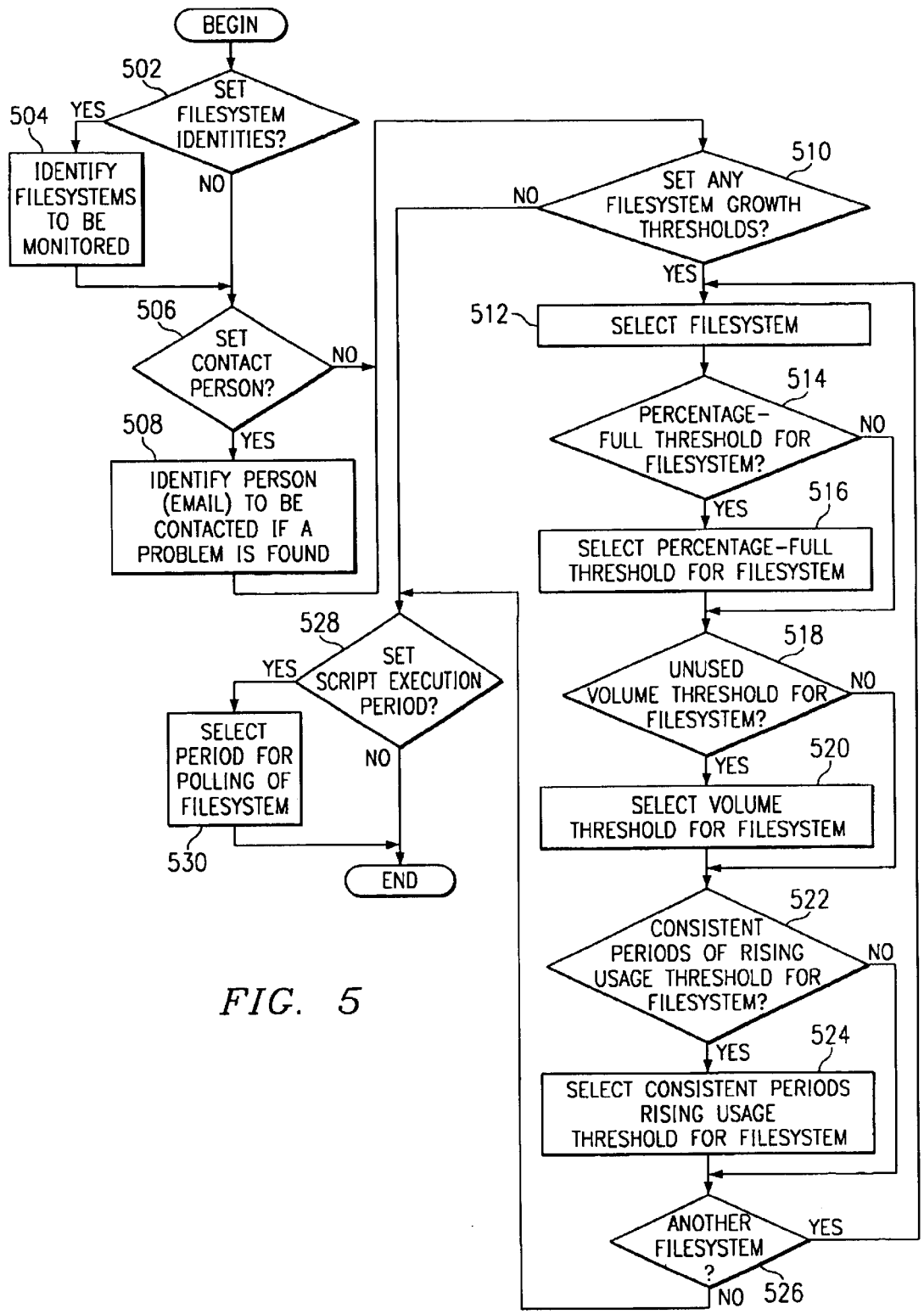
FIG. 5 is a flowchart illustrating the process of selecting the predefined growth thresholds in accordance with a preferred embodiment of the present invention.

FIG. 5 is a flowchart illustrating the process of selecting predefined growth thresholds in accordance with a preferred embodiment of the present invention. The process begins with a determination as to whether to set filesystem identity (step 502). If the filesystem has not already been identified, or if filesystem identity needs to be changed, the process flows to step 504, where the filesystem(s) to be monitored is identified (step 504). Otherwise, the process flows to step 506, where a determination is made whether to identify a contact person. If a contact person has not previously been identified, or a contact person is to be added, the person to be contacted is identified by an email address (step 508). Alternative contacts might also be identified for situations where an excess over a preset threshold is critical. Otherwise, the process flows directly from step 506 to step 510, where a determination is made as to whether any filesystem growth thresholds are to be set. Of course, thresholds may already exist, in which case the process may flow directly to step 528.

If, however, thresholds are to be set, the filesystem is selected (step 512). Next, a determination is made whether to monitor that filesystem's growth by percentage-full threshold for the filesystem (step 514). Any percentage of available filesystem space may be used as a growth indicator. If the percentage-full threshold is to be used, a percentage is selected with which to compare the volume information of the selected threshold (step 516).

Returning to step 514, if it is determined not to use the percentage-full threshold, the process flows to the next threshold type, which is the total unused volume threshold, or the actual physical size available for filesystem expansion. Here, a determination is made as to whether the unused total volume threshold for the filesystem is to be used to monitor the filesystem's growth (step 518). If not, the process flows to step 522, where the next threshold is checked. If the unused total volume threshold is to be used, a threshold is determined based on the available space for filesystem expansion (step 520). When this threshold is exceeded, it signifies a problem with the filesystem. The process then flows to step 522, where it is determined whether the consecutive number of rising usage periods will be used as an indicator for judging the filesystem's growth. Actually, the threshold need not be limited to consecutive periods but might instead indicate a consistent number of rising usage periods, such as nine out of the last ten periods of rising usage. If the consecutive number of rising usage periods is not to be used, the process flows to step 526, where a determination is made as to whether another filesystem is to be checked. If it is determined to use a number of consecutive rising growth periods as a growth indicator, then a threshold number is set establishing the number of polling periods of consecutive growth that will signify a problem (step 524). A determination is then made whether to set thresholds for another filesystem (step 526). If thresholds for another filesystem are to be set, the process reverts to step 512. Otherwise, it is determined whether to set a script execution period (step 528).

In a preferred embodiment of the present invention, the script execution period is not a function of the script itself but is entered in a crontab. Crontab is the file that contains all "timed" jobs; i.e., anything placed into the crontab file will be executed at the time indicated, and with the arguments given, in the file. However, in other embodiments, the script may be self executing, and the execution time may be specified in the script itself. Thus, the script checks the system time against the time threshold and executes the growth monitoring functions after the system time crosses a timing threshold. If the script execution interval is to be set, a time interval for polling of the filesystem is selected (step 530), and the process ends. Otherwise, the process ends immediately after step 528.

Figure 6:
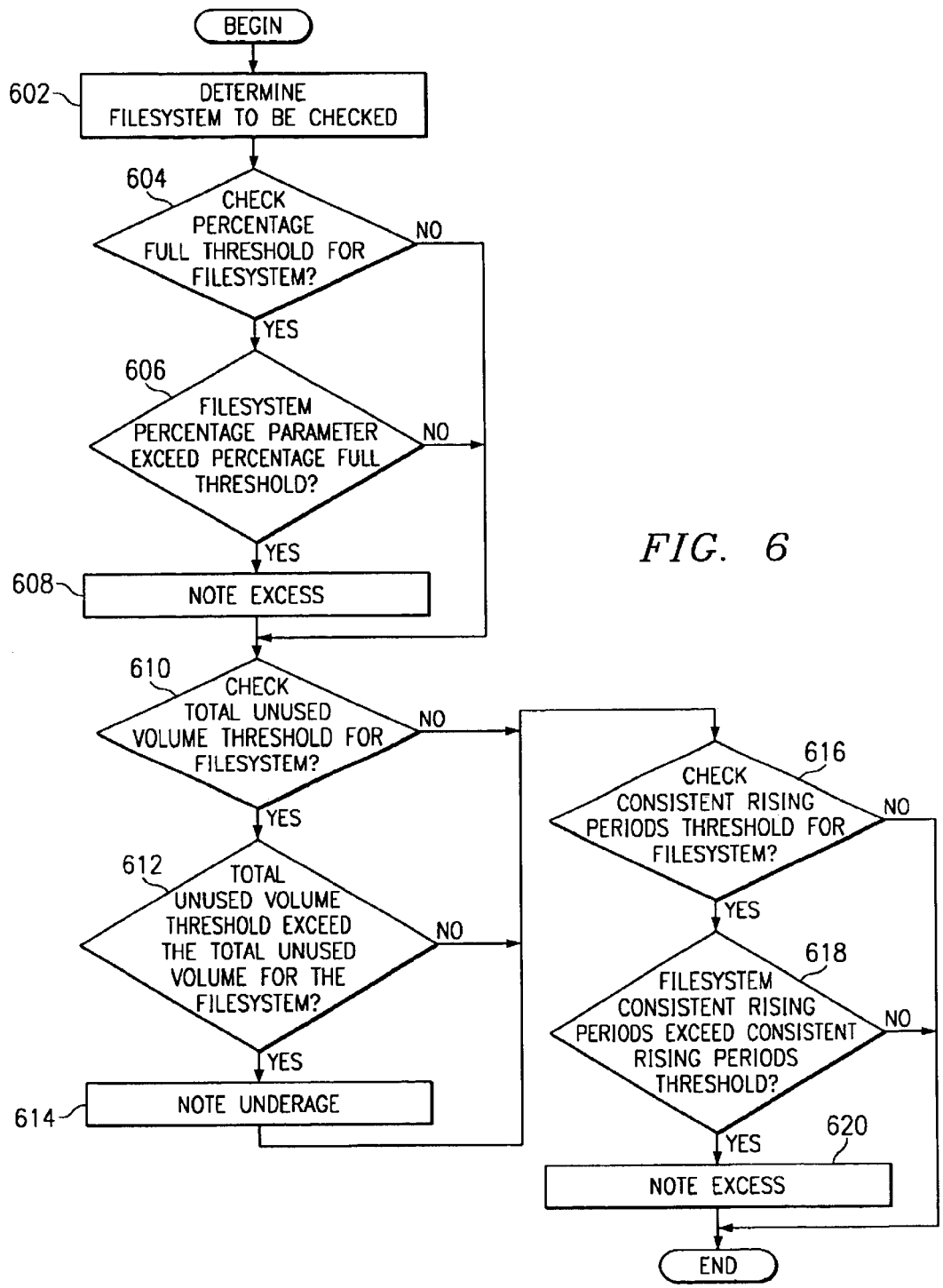
FIG. 6 is a flowchart depicting the process for checking growth thresholds.

FIG. 6 is a flowchart depicting the process for checking growth thresholds, expanding on step 412 of FIG. 4. The process begins by determining the particular filesystem to be checked (step 602). While this step has been completed in the process depicted in FIG. 4, it is important to note for the present process that the thresholds are based on a particular filesystem. Next, a determination is made as to whether to check the percentage-full threshold for the filesystem (step 604). If the percentage-full threshold is not to be used as a growth indicator for this filesystem, the process flows immediately to step 610. If the percentage-full threshold is to be used as a growth parameter, the process flows to step 606, where a determination is made as to whether the actual percentage of full filesystem space exceeds the percentage-full threshold selected for the filesystem. If the actual percentage of full filesystem space does not exceed the threshold, the process flows to step 610. If the filesystem usage value does exceed the threshold, the amount of the excess is cached (step 608).

Next, a determination is made as to whether the total unused volume threshold for the filesystem is to be used as a growth indicator. If not, the process flows immediately to step 616. Otherwise, a determination is made as to whether the total unused volume threshold exceeds the actual total unused volume for the filesystem (step 612). If not, the process flows to step 616. Otherwise, the amount of the underage is cached (step 614), and the process then flows to step 616.

Finally, a check is made as to whether the number of consistent rising growth periods is to be used as a threshold (step 616). If not, the process ends. Otherwise, a determination is made as to whether the number of consistent rising growth periods exceeds the threshold selected for the number of rising growth periods (step 618). If not, the process ends. If the number of consecutive rising growth periods exceeds the threshold, the amount of the excess is cached (step 620), and the process then ends.

FIGS. 7 through 9 constitute a script which, when executed, monitors system usage based on predetermined growth parameters. Following are some definitions which may be helpful in understanding the context of the script:

Script Syntax:

fsmon -f<filesystem> -e<emailaddress> -p<percent used>
   -u<unused megabytes> -c<consistently rising periods>
   -v The options:

-f<filesystem> provides the user the choice of which filesystem to monitor. This frequently stipulates the standard UNIX filesystems, such as "/var," "/tmp," and the root filesystem, although it can also be used to monitor others as well. An additional example might be a database log filesystem, which will fill up as activity on the database continues. Thus, the present invention provides administrators with an effective tool to monitor any and all filesystems. If no "-f" flag is used, the default filesystem is /var.

-e<emailaddress> is the user who should be mailed if a problem condition is found. Note that, with the advent of text pages being sent to pagers, this function permits a variety of notification methods. If no "-e" flag is used, email notification will simply be sent to "root@<hostname>".

-p<percent used> is the percentage of a filesystem used which will create a trigger condition, should the actual use exceed this value. This flag may be omitted if triggering is only desired off of other elements.

-u<unused megabytes> is the value of free megabytes in the filesystem which will create a trigger condition, should the actual value fall below this. This flag may be omitted if triggering is only desired off of other elements.

-c<consistently rising periods> is the number of consecutively rising use periods that will result in a trigger condition. Note that, for the last three trigger values, if any one (or more) of them are exceeded, the trigger will occur and send the email to the administrator. This flag may be omitted if triggering is only desired off of other elements.

Note that any or all of the last three flags may be stipulated. If any flag is omitted, that criteria will not be checked. If all flags are omitted, the script will use a default parameter of "-p 80".

-v specifies "verbose" mode, under which the tool generates maximum output for the user's information.

Although the preferred embodiments of the present invention have been implemented using a UNIX based operating system, the features and advantages of the present invention transcend specific operating system types. For example, using Windows 95/98/NT, the entire disk space is treated as a single filesystem for purposes of implementing the present invention on Windows. If total disk space is 20 GB, the same principles outlined here may be used with a 500 MB or 1 GB free space threshold, for example. In so doing, a usable disk space threshold is defined as a parameter for alerting an administrator if total disk space drops below the usable disk space threshold. Using the disclosure of the present invention, one of ordinary skill can understand techniques for modifying the thresholds for use with other operating system and/or for monitoring other system parameters that are indicative of system usage and/or system growth.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for monitoring a filesystem's usage growth, comprising:
    defining a filesystem usage parameter;
    setting a filesystem usage parameter threshold associated with the filesystem usage parameter;
    defining a time interval for receiving a filesystem usage specific;
    satisfying the time interval;
    receiving the filesystem usage specific for the filesystem usage parameter on the basis of the time interval being satisfied;
    comparing the filesystem usage specific to the filesystem usage parameter threshold; and
    outputting a notification based on the comparison indicating a problem with filesystem usage;
    wherein the step of comparing further comprises comparing the filesystem usage specific of a number of consistent rising growth time intervals to the filesystem usage parameter threshold of consistent rising growth time intervals.

2. The method recited in claim 1, wherein the steps of receiving the filesystem usage specific and comparing the filesystem usage specific are contained in an executable script.

3. The method recited in claim 1, wherein the filesystem usage parameter threshold is one of percentage e volume for the filesystem, total unused volume available for the filesystem and consistent periods of rising filesystem usage.

4. The method recited in claim 1, wherein the filesystem is a first filesystem, the method further comprising:
    defining a filesystem usage parameter for a second filesystem;
    setting a filesystem usage parameter threshold associated with the filesystem usage parameter for the second filesystem;
    defining a time interval for receiving a filesystem usage specific for the second filesystem;
    satisfying the time interval;
    receiving the filesystem usage specific for the filesystem usage parameter on the basis of the time interval being satisfied for the second filesystem;
    comparing the filesystem usage specific to the filesystem usage parameter threshold for the second filesystem; and
    outputting a notification based on the comparison.

5. The method recited in claim 1, wherein the step of comparing further comprises comparing the filesystem usage specific of actual percent of full filesystem usage to the filesystem usage parameter threshold of percent of full filesystem usage to the filesystem.

6. The method recited in claim 1, wherein the step of comparing further comprises comparing the filesystem usage specific of actual unused total volume available to the filesystem usage parameter threshold of unused total volume.

7. The method recited in claim 1, wherein the steps of outputting comprises emailing the notification.

8. The method recited in claim 1, wherein the step of defining a time interval comprises setting a chronological schedule.

9. A data processing system implemented method for monitoring a filesystem's usage growth comprising:
    executing a script, wherein the script comprises:
    receiving a filesystem usage specific for the filesystem usage parameter;
    accessing a filesystem usage parameter threshold associated with the filesystem usage parameter;
    comparing the filesystem usage specific to the filesystem usage parameter threshold; and
    outputting a result of the comparison;
    wherein the step of comparing further comprises comparing the filesystem usage specific of a number of consistent rising growth time intervals to the filesystem usage parameter threshold of consistent rising growth time intervals.

10. The method recited in claim 9, wherein the script is one of self-executing, executed on the basis a preset time interval and executed on the basis of an occurrence of antecedent event.

11. The method recited in claim 9, wherein the step of comparing further comprises comparing the filesystem usage specific of actual percent of full filesystem usage to the filesystem usage parameter threshold of percent of full filesystem usage to the filesystem.

12. The method recited in claim 9, wherein the step of comparing further comprises comparing the filesystem usage specific of actual unused total volume available to the filesystem usage parameter threshold of unused total volume.

13. A data processing system for monitoring a filesystem's usage growth comprising:
    defining means for defining a filesystem usage parameter;
    setting means for setting a filesystem usage parameter threshold associated with the filesystem usage parameter;
    defining means for defining a time interval for receiving a filesystem usage specific;
    satisfying means for satisfying the time interval;
    receiving means for receiving the filesystem usage specific for the filesystem usage parameter on the basis of the time interval being satisfied;

comparing means for comparing the filesystem usage specific to the filesystem usage parameter threshold; and outputting means for outputting a notification based on the comparison indicating a problem with filesystem usage;

wherein the comparing means for comparing further comprises means for comprises comparing the filesystem usage specific of a number of consistent rising growth time intervals to the filesystem usage parameter threshold of consistent rising growth time intervals.

14. The system recited in claim 13, wherein the receiving means for receiving the filesystem usage specific and comparing means for comparing the filesystem usage specific are contained in an executable script.

15. The system recited in claim 13, wherein the filesystem usage parameter threshold is one of percentage e volume for the filesystem, total unused volume available for the filesystem and consistent periods of rising filesystem usage.

16. The system recited in claim 13, wherein the filesystem is a first filesystem, the method further comprising:

defining means for defining a filesystem usage parameter for a second filesystem;

setting means for setting a filesystem usage parameter threshold associated with the filesystem usage parameter for the second filesystem;

defining means for defining a time interval for receiving a filesystem usage specific for the second filesystem;

satisfying means for satisfying the time interval;

receiving means for receiving the filesystem usage specific for the filesystem usage parameter on the basis of the time interval being satisfied for the second filesystem;

comparing means for comparing the filesystem usage specific to the filesystem usage parameter threshold for the second filesystem; and outputting means for outputting a notification based on the comparison.

17. The system recited in claim 13, wherein the comparing means for comparing further comprises comparing means for comparing the filesystem usage specific of actual percent of full filesystem usage to the filesystem usage parameter threshold of percent of full filesystem usage to the filesystem.

18. The system recited in claim 13, wherein the comparing means for comparing further comprises comparing means for comparing the filesystem usage specific of actual unused total volume available to the filesystem usage parameter threshold of unused total volume.

19. The system recited in claim 13, wherein the outputting means for outputting comprises emailing the notification.

20. The system recited in claim 13, wherein the defining means for defining a time interval comprises setting a chronological schedule.

21. A data processing system for monitoring a filesystem's usage growth comprising:

executing means for executing a script, wherein the script comprises:

receiving means for receiving a filesystem usage specific for the filesystem usage parameter;

accessing means for accessing a filesystem usage parameter threshold associated with the filesystem usage parameter;

comparing means for comparing the filesystem usage specific to the filesystem usage parameter threshold; and outputting means for outputting a result of the comparison;

where in the comparing means for comparing further comprises comparing the filesystem usage specific of a number of consistent rising growth time intervals to the filesystem usage parameter threshold of consistent rising growth time intervals.

22. The system recited in claim 21, wherein the script is one of self-executing, executed on the basis a preset time interval and executed on the basis of an occurrence of antecedent event.

23. The system recited in claim 21, wherein the comparing further comprises comparing the filesystem usage specific of actual percent of full filesystem usage to the filesystem usage parameter threshold of percent of full filesystem usage to the filesystem.

24. The system recited in claim 21, wherein the comparing means for comparing further comprises comparing means for comparing the filesystem usage specific of actual unused total volume available to the filesystem usage parameter threshold of unused total volume.

25. A computer program product for implementing a method for monitoring a filesystem's usage growth comprising:

defining instructions for defining a filesystem usage parameter;

setting instructions for setting a filesystem usage parameter threshold associated with the filesystem usage parameter;

defining instructions for domining a time interval for receiving a filesystem usage specific;

satisfying instructions for satisfying the time interval;

receiving instructions for receiving the filesystem usage specific for the filesystem usage parameter on the basis of the time interval being satisfied;

comparing instructions for comparing the filesystem usage specific to the filesystem usage parameter threshold; and outputting instructions for outputting a notification based on the comparison indicating a problem with filesystem usage;

wherein comparing instructions for comparing further comprises comparing the filesystem usage specific of a number of consistent rising growth time intervals to the filesystem usage parameter threshold of consistent rising growth time intervals.

* * * * *

UNITED STATES PATENT AND TRADEMARK OFFICE
CERTIFICATE OF CORRECTION

PATENT NO. : 6,832,236 B1
DATED : December 14, 2004
INVENTOR(S) : Hamilton, II et al.

It is certified that error appears in the above-identified patent and that said Letters Patent is hereby corrected as shown below:

Column 13,
Line 59, after "percentage" delete "e".

Column 15,
Line 17, after "percentage" delete "e".

Column 16,
Line 11, before "the comparing" delete "where in" and insert -- wherein --.
Line 38, after "instructions for" delete "domining" and insert -- defining --.

Signed and Sealed this

Fourteenth Day of March, 2006

JON W. DUDAS
*Director of the United States Patent and Trademark Office*